Nov. 3, 1936.   C. E. RALPH   2,059,909

DOMESTIC WATER SUPPLY APPARATUS

Filed April 16, 1932   2 Sheets-Sheet 1

Inventor
Clarence E. Ralph
By Nathaniel Frucht
his Attorney

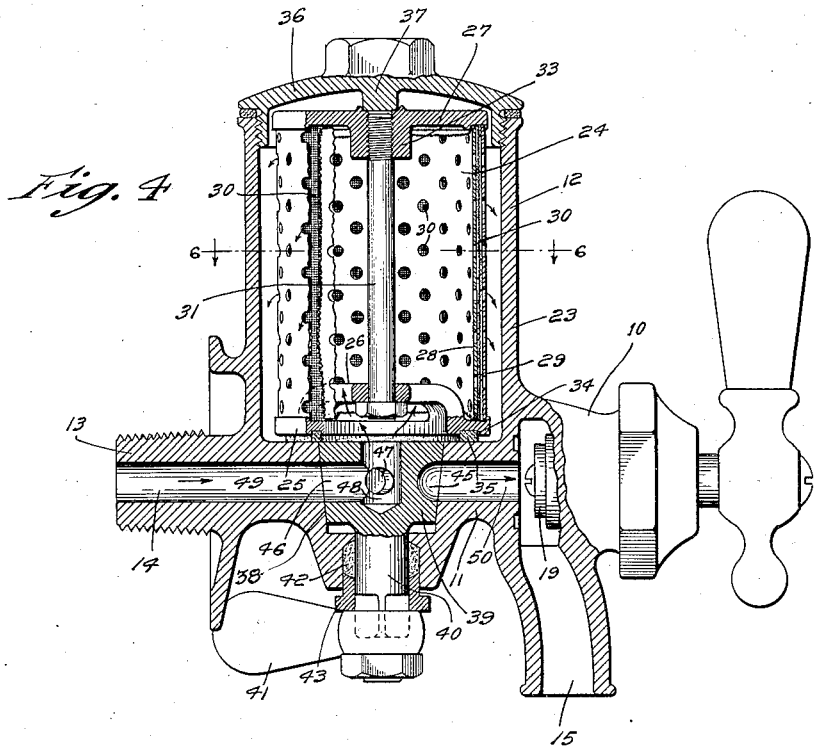

Patented Nov. 3, 1936

2,059,909

UNITED STATES PATENT OFFICE 2,059,909

DOMESTIC WATER SUPPLY APPARATUS

Clarence E. Ralph, Mansfield, Mass.

Application April 16, 1932, Serial No. 605,690

1 Claim. (Cl. 210—77)

My present invention relates to domestic water supply apparatus, and has particular reference to connections for supplying water for drinking and cooking.

The water supply for household use frequently contains a high percentage of solid matter, either because the water is not sufficiently filtered or because the house pipes themselves are old and rusty. The use of charcoal and similar filters is well-known, these filters being usually connected in the flow line, in the case of large filters, or attached to the faucet, in the case of small filters.

Large filters have been found objectionable, due to their initial cost and to the difficulty of cleaning or replacing the filter material. Small filters are also difficult to thoroughly clean, and are usually of a relatively inefficient type. It is the principal object of my invention to devise a filter construction that is quickly installed, is inexpensive, is efficient in operation, and is easily and expeditiously cleaned. To this end, I have devised a combination filter and faucet, which may be readily interchanged for the house faucets now in use and which need not be removed for cleaning.

With the above and other objects and advantageous features in view, my invention consists of a novel arrangement of parts more fully disclosed in the detailed description following, in conjunction with the accompanying drawings, and more specifically defined in the claim appended hereto.

In the drawings,

Fig. 4 is a vertical section, parts being broken away, through Fig. 1;

Fig. 5 is a detail fragmentary view showing the filter chamber outlet; and

Fig. 6 is a section in the line 6—6 of Fig. 4.

Figure 1:
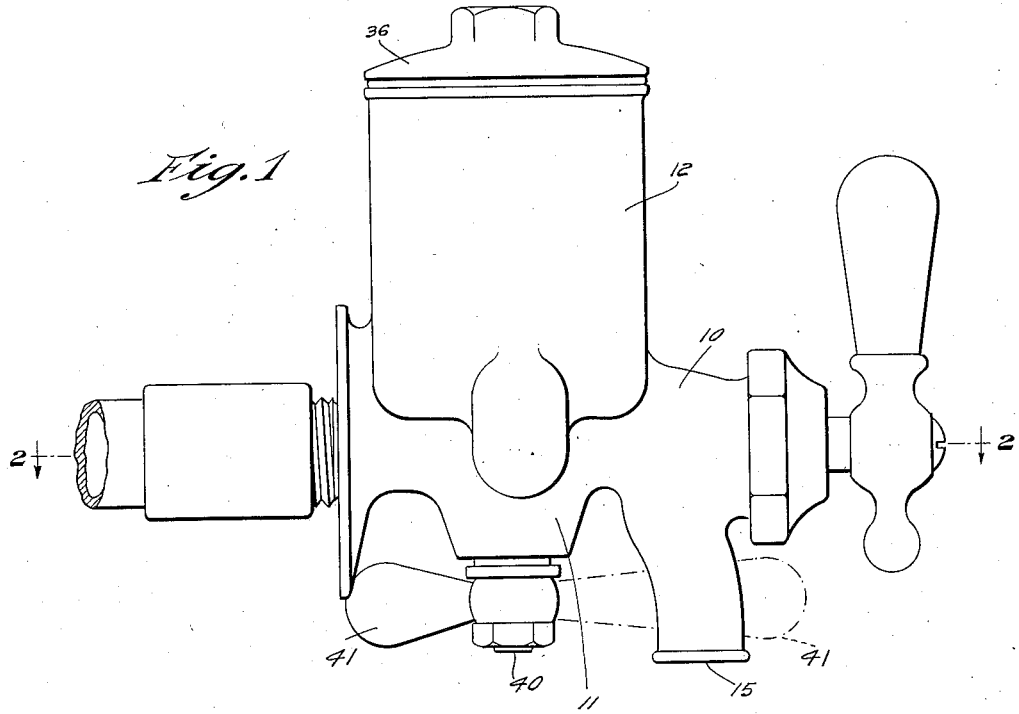
Fig. 1 is an elevation of the novel construction.

Referring to the drawings, the casing 10 includes a lower flow portion 11 and an upper filter section 12. As more clearly shown in Fig. 4, the flow portion 11 has an inlet connection 13 which is adapted to be secured to a water supply connection by means of a union of standard type, this inlet connection communicating with a flow passageway 14 which terminates in an outlet nozzle 15. The flow portion ends in a valve housing 16 which has a hand operated faucet valve 17 of usual type mounted therein to control the communication of the flow passageway with the outlet nozzle, the faucet valve having a barrel portion 18 which is threadedly mounted in the casing, and a closure gasket 19 adapted to engage the end of the flow passageway when the faucet valve is in closed position. The faucet valve has the usual end packing 20 and end washer 21, held in place by a removable cap 22 which screw threadedly engages the end of the valve housing.

The filter section 12 includes a container 23, which is preferably of cylindrical form and open at the top, and which may be cast integral with the flow portion. A filter element 24 is mounted in the filter section, and comprises a lower annular plate 25 having an integral upwardly positioned spider 26, an upper disk plate 27, and two concentric perforated shells 28, 29 between which a textile or other filter material 30 is mounted, the filter element being locked together by means of a central bolt 31 which passes through a central opening 32 in the spider and threadedly engages a central hub 33 of the disk plate.

The annular plate 25 has a recess 34 in which a packing ring 35 is mounted, and the filter member is locked in position in the container by the container cap 36 which threadedly engages the container and has a central boss 37 pressing against the disk plate.

Referring now to Figs. 4 and 5, the flow portion has a tapered valve seat 38 cut therein, in which a tapered valve 39 is mounted, the valve stem 40 extending through the base of the flow portion and having a handle 41 secured thereto, and being packed in the usual manner by packing 42 seated in the usual recess and secured by a flange nut 43. The tapered valve has two ports, 44, 45 formed therein, the port 44 being a three way port with passages 46, 47 and 48, and the port 45 being a groove type port. The passage 48 is vertical, and communicates with the filter section through the interior of the annular disk 26, and the passages 46, 47 are adapted to selectively communicate with the inlet portion 49 of the flow passageway and the outlet portion 50 thereof. The filter section has an outlet chamber 51 which communicates with the space between the container and the filter element, and the port 45 is adapted to selectively communicate the outlet chamber 51 with the outlet portion 50 or the inlet portion 49.

Figure 2:
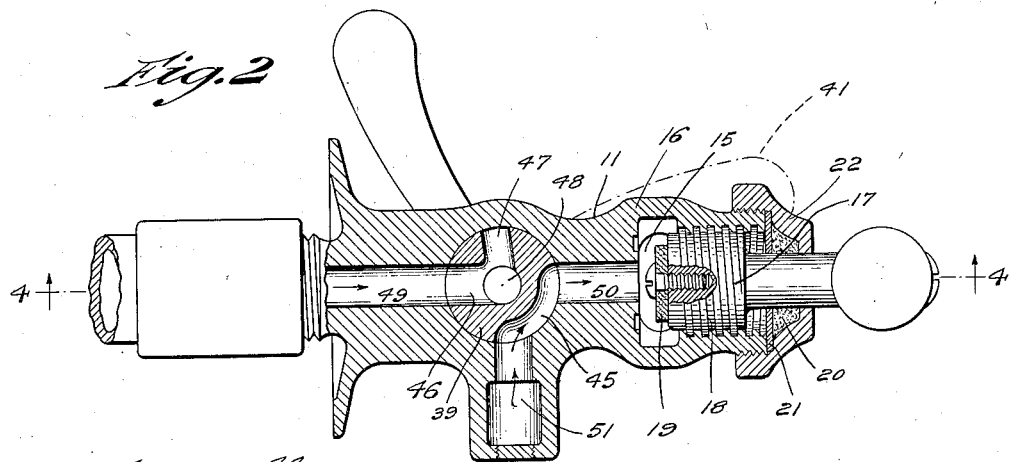
Fig. 2 is a section thereof on the line 2—2 of Fig. 1.
Figure 3:
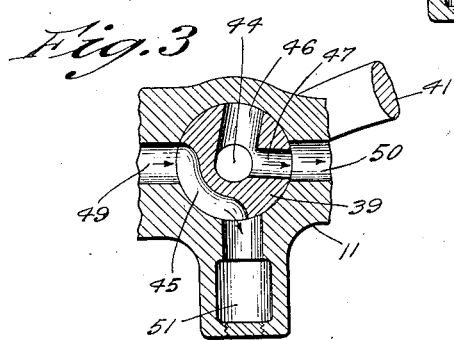
Fig. 3 is a fragmentary detail, similar to Fig. 2, showing the filter control valve in reversed position.

The operation of the novel apparatus may now be explained:

The water entering the flow passageway, see Figs. 2 and 4, passes upwardly into the space within the filter elements, through the filter element to the space between the element and the container, and thence out the outlet chamber to the outlet nozzle, where the flow is controlled by the valve 17. To clean the filter, the valve 39 is turned to the position shown in Fig. 3; the inflowing water now passes upwardly through the chamber 51, through the filter element in reverse direction, and out through the central port 48 to the outlet nozzle. The filter element is readily removed and replaced by removing the container top, and the filter material is quickly changed by separating the filter element parts. When removing or inspecting the filter element complete stoppage of flow is obtained by setting the tapered valve so as to position a solid portion of the tapered valve, preferably the portion between ports 46, 45, across the inlet portion 49 to close the same.

If desired the construction may be modified to have both hot and cold water enter the flow passageway, by using connections of standard type; but it is preferred to utilize a separate filter for the hot and the cold streams, and join the outlet portions of the two flow passageways by a swinging nozzle of standard type, thus eliminating the time interval involved in waiting for the necessary outflow of water from the filter where changing from hot to cold, and vice versa.

While I have described a specific constructional embodiment of my invention, such changes in form, in arrangement and in dimensions of the parts, may be made as appear desirable, within the spirit and the scope of the invention as defined in the appended claim.

I claim:—

In a combination, a casing having an inflow conduit, an outflow conduit, and a control flow opening in the bottom wall thereof and a flow passageway in the side thereof, said casing having a removable top, and a removable filter frame therein comprising a filter resting on said bottom wall and in the path of flow of fluid between said control opening and said flow passageway, and a plug valve in said control flow opening having ports for connecting said inflow conduit to said control flow opening and said flow passageway to said outflow conduit, and movable to alternatively connect said inflow conduit to said flow passageway and said control opening to said outflow conduit.

CLARENCE E. RALPH.